Sept. 1, 1925.
E. T. BASTIS
1,552,196
WINDSHIELD GLARE DEFLECTOR
Filed Oct. 22, 1923
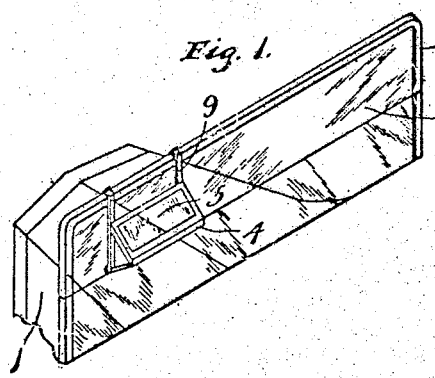
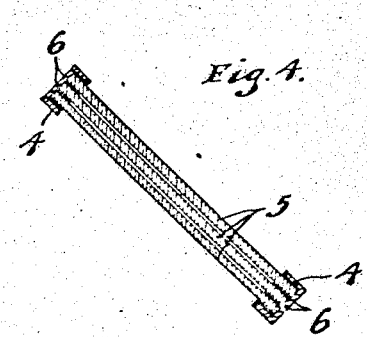
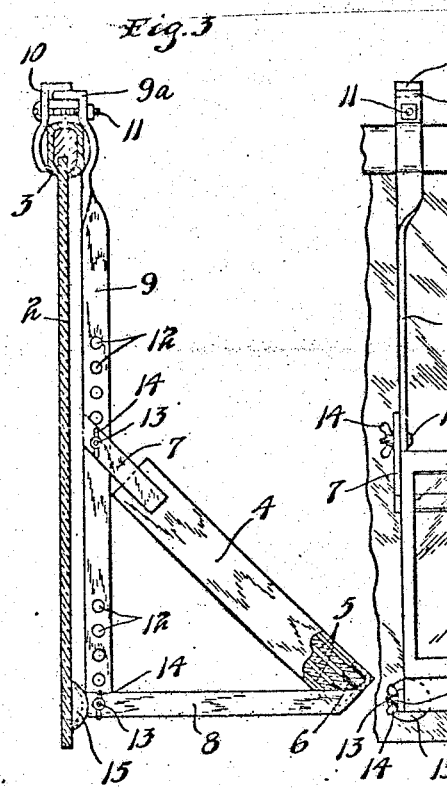
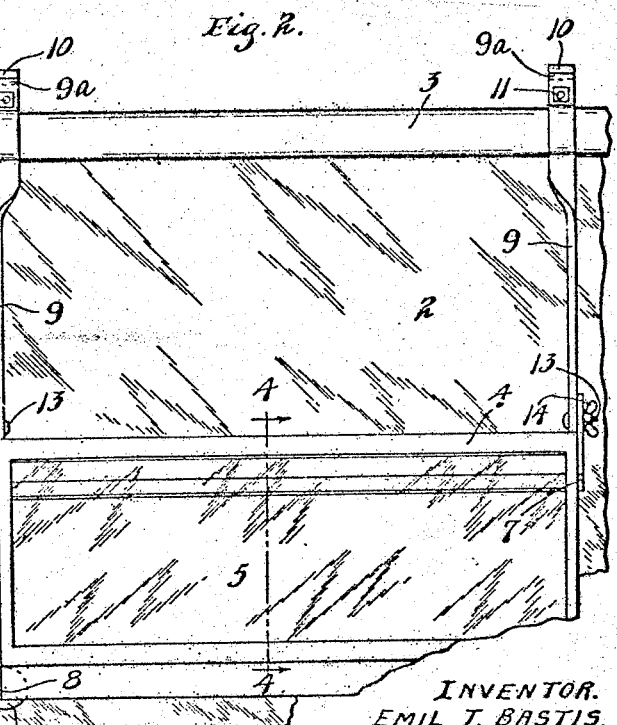
INVENTOR.
EMIL T. BASTIS.
BY HIS ATTORNEY.
James F. Williamson Patented Sept. 1, 1925.

1,552,196

UNITED STATES PATENT OFFICE.

EMIL T. BASTIS, OF MINNEAPOLIS, MINNESOTA.

WINDSHIELD GLARE DEFLECTOR.

Application filed October 22, 1923. Serial No. 670,025.

*To all whom it may concern:*

Be it known that I, EMIL T. BASTIS, a citizen of the United States, residing at Minneapolis, in the county of Hennepin and State of Minnesota, have invented certain new and useful Improvements in a Windshield Glare Deflector; and I do hereby declare the following to be a full, clear, and exact description of the invention, such as will enable others skilled in the art to which it appertains to make and use the same.

This invention relates to a glare shield of the type commonly used in connection with the ordinary wind shield used on an automobile.

It is an object of this invention to provide a glare shield adapted to be disposed at an angle to the plane of the wind shield and which comprises a plurality of transparent sheets.

It is a further object of the invention to provide a glare shield comprising a frame containing a plurality of parallel transparent plates together with means for holding the same in various positions at the inside of and supported from the windshield.

These and other objects and advantages of the invention will more fully appear from the following description made in connection with the accompanying drawings in which like reference characters refer to the same parts throughout the different views, and in which, Fig. 1 is a diagonal view showing the device attached to a wind shield, a portion of the automobile also being indicated;

Fig. 2 is a view in elevation of the device, as seen from the inside of the windshield;

Fig. 3 is a view in side elevation of the device, a portion of the device and the wind shield being shown in vertical section; and Fig. 4 is a vertical section taken on the line 4—4 of Fig. 2.

Referring to the drawings, in Fig. 1 a portion of the hood 1 of the automobile is indicated, together with the ordinary wind shield 2 having the frame 3 extending thereabout. The device of the invention comprises a rectangular frame 4 substantially channel shape in cross section, as shown in Fig. 4, in which is mounted a plurality of parallel transparent plates 5 disposed in slightly spaced relation and separated from each other and from the frame 4 by strips 6 of fabric or slightly resilient material. A pair of arms 7 extend from the end portions of frame 4 upwardly parallel therewith which arms will be secured to said frame in any suitable manner, preferably by spot welding. Another pair of arms 8 extend angularly from the lower portions of the ends of frame 4 substantially at an angle of 45°. The members 8 are secured to the frame 4 in any suitable manner, preferably by spot welding. The frame 4 is adapted to be disposed at an angle to the plane of the wind shield 2 and for this purpose, a pair of strips or bars 9 are provided which depend at the inner surface of the wind shield substantially parallel thereto. The strips 9 at their upper ends, are twisted through a 90° angle and formed with a curved portion and a terminal portion bent at a right angle to form one member 9ᵃ of a clamp. The other part 10 of said clamp is also formed of a narrow strip and bent at a slight angle to overlap the top of portion 9ᵃ and also formed with a curved portion embracing the outer sides of the frame 3. The members 10 are connected to the members 9ᵃ by headed and nutted bolts 11 adapted to clamp said members to the frame 3 so that the strips 9 are supported from said frame 3. The members 7 and 8 contact the outer sides of the strips 9 and the latter are provided with a plurality of spaced holes 12 with which similar holes in members 7 and 8 aline. Headed bolts 13 extend through said alined holes and are engaged by the wing nuts 14. The frame 4 is thus held at an angle to the wind shield 2 and in the embodiment of the invention illustrated, said angle is shown as approximately 45°. The said frame can be held in various vertical positions by inserting the bolt 13 through other of the holes 12. The strips 9, of course, can be disposed in different positions longitudinally of the frame 3. The lower ends of the strips 9 are provided with resilient pads or cups 15 adapted to engage the inner surface of the shield 2.

In operation, the frame 4, with its plates 5, will be disposed as desired, at the inside of the shield and where the same will effectively intercept the rays from the lights of an approaching machine or from the sun. The said rays pass through the shield 2 and successively strike the surfaces of the plates 5. A certain portion of the light will be reflected by each of said surfaces of plates 5 so that the light after passing through all of said plates effectively will be dimmed. The blinding glare often caused by the lights of an approaching car or by the sun is thus eliminated, at the same time, the vision through the plates 5 is not impaired. The plates 5 will be supplied in a sufficient number to produce the desired dimming effect upon the light, only three of said plates being shown in the embodiment of the invention illustrated. The angle of the frame 4 and plates 5 will also be determined to give the best effect. The pads 15 will prevent any rattling or knocking of the strips 9 against the inner side of the wind shield 2.

From the above description it is seen that applicant has provided a very simple and efficient glare preventing device. The same can easily be attached to practically all standard automobiles and can be quickly placed in position or removed. The device comprises few parts and can be easily made. The same has been actually demonstrated in practice and found to be very successful and efficient for the purpose intended.

It will, of course, be understood, that various changes may be made in the form, details, arrangement and proportions of the parts without departing from the scope of applicant's invention, which, generally stated, consists in a device capable of carrying out the objects above stated, such as shown and described and set forth in the appended claims.

What I claim is:

1. The combination with a wind shield, of a glare shield comprising a plurality of slightly spaced transparent sheets, and means for supporting the same in different positions on said wind shield.

2. The combination with the wind shield of an automobile, of a glare shield comprising a plurality of spaced transparent plates extending downwardly and inwardly from said wind shield, and means for supporting the same in different vertical positions on said wind shield.

3. The combination with a normally vertical wind shield of an automobile, of spaced bars extending vertically at the inner side thereof, and detachably secured to the top of said shield, a glare shield of transparent laminated material extending inwardly at an angle to said wind shield, means on said glare shield adjustable to different positions along said bars, and means for holding said last mentioned means and said glare shield in position on said bars.

4. The combination with the wind shield of an automobile, of a glare shield comprising a plurality of spaced transparent sheets extending inwardly and downwardly at an angle of substantially 45° to said wind shield, and means for holding the glare shield in various vertical positions relative to said wind shield.

5. The combination with the wind shield of an automobile, of a glare shield comprising a rectangular frame, a plurality of parallel sheets of transparent material held therein, said frame and sheets extending inwardly and downwardly from said wind shield at the inner side thereof, arms extending upwardly from the upper portion of the ends of said frame, arms extending substantially horizontal from the lower portions of the ends of said frame, and spaced strips at the innner side of said wind shield to which said bars are adjustably connected.

EMIL T. BASTIS.